United States Patent
Vajravel et al.

(10) Patent No.: US 11,416,433 B2
(45) Date of Patent: Aug. 16, 2022

(54) ENHANCING THE PERFORMANCE OF A WIRELESS DOCK WHEN A USB MASS STORAGE DEVICE IS CONNECTED

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 213 days.

(21) Appl. No.: 17/010,081

(22) Filed: Sep. 2, 2020

(65) Prior Publication Data
US 2022/0066972 A1 Mar. 3, 2022

(51) Int. Cl.
*G06F 11/07* (2006.01)
*G06F 13/40* (2006.01)
*G06F 13/16* (2006.01)
*G06F 13/42* (2006.01)

(52) U.S. Cl.
CPC ...... *G06F 13/4068* (2013.01); *G06F 11/0745* (2013.01); *G06F 11/0751* (2013.01); *G06F 11/0772* (2013.01); *G06F 13/1668* (2013.01); *G06F 13/4282* (2013.01)

(58) Field of Classification Search
CPC ............ G06F 13/4068; G06F 11/0745; G06F 11/0751; G06F 11/0772; G06F 13/1668; G06F 13/4282
See application file for complete search history.

(56) References Cited

U.S. PATENT DOCUMENTS

| | | | |
|---|---|---|---|
| 7,770,054 B2 * | 8/2010 | Clark | H04L 49/901 714/4.11 |
| 11,288,216 B1 * | 3/2022 | Thiruchengode Vajravel | G06F 13/385 |
| 11,360,844 B1 * | 6/2022 | Dodsley | G06F 11/008 |
| 2004/0122986 A1 * | 6/2004 | Diamant | G06F 13/24 710/5 |
| 2008/0140811 A1 * | 6/2008 | Welch | H04L 12/4625 709/219 |
| 2011/0314196 A1 * | 12/2011 | Ortiz | G06F 13/426 710/106 |
| 2013/0326095 A1 * | 12/2013 | Edney | G06F 9/4413 710/38 |
| 2016/0170824 A1 * | 6/2016 | Hamo | H04L 1/1671 714/763 |
| 2017/0168971 A1 * | 6/2017 | Glik | G06F 13/4068 |

(Continued)

FOREIGN PATENT DOCUMENTS

WO WO-2014057465 A1 * 4/2014 ........... G06F 1/1632

*Primary Examiner* — Bryce P Bonzo
*Assistant Examiner* — Indranil Chowdhury
(74) *Attorney, Agent, or Firm* — Kirton McConkie; Brian Tucker

(57) ABSTRACT

The performance of a wireless dock can be enhanced when a USB mass storage device is connected to the wireless dock. Filter drivers can be loaded on the USB stacks of a computing device and the wireless dock to perform functionality for reducing the number of communications that are sent over a wireless network when a USB mass storage device is connected to the computing device via the wireless dock. This reduction in the number of communications can be accomplished without jeopardizing data integrity or compliance with governing protocols.

20 Claims, 16 Drawing Sheets

(56) References Cited

U.S. PATENT DOCUMENTS

| | | | |
|---|---|---|---|
| 2017/0180516 A1* | 6/2017 | Chauhan | G06F 13/4282 |
| 2018/0143932 A1* | 5/2018 | Lawless | G06F 13/4068 |
| 2018/0267918 A1* | 9/2018 | Raju | G06F 13/4072 |
| 2019/0026226 A1* | 1/2019 | Boyd | G06F 12/0877 |
| 2019/0042504 A1* | 2/2019 | Levy | G06F 13/385 |
| 2022/0066836 A1* | 3/2022 | Vajravel | G06F 9/5061 |
| 2022/0201577 A1* | 6/2022 | Narula | H04W 48/18 |

* cited by examiner

ENHANCING THE PERFORMANCE OF A WIRELESS DOCK WHEN A USB MASS STORAGE DEVICE IS CONNECTED

CROSS-REFERENCE TO RELATED APPLICATIONS

N/A

BACKGROUND

A dock provides a way to quickly and easily connect a computing device to peripherals. For example, docks are commonly used in the workplace to connect a laptop to a monitor, keyboard and mouse without sacrificing the laptop's mobility. Traditionally, laptops (and other computing devices) have connected to docks via a physical and oftentimes proprietary connection. However, with the availability of high-speed wireless networks, wireless docks are becoming more commonplace. With a wireless dock, a computing device can access peripherals that are connected to the wireless dock using wireless communication protocols. For example, when a computing device is connected to a wireless dock to which a USB device is connected, the computing device can communicate with the USB device over a Wi-Fi connection using the Media-Agnostic USB (MA-USB) protocol or another USB over IP protocol.

In an environment where multiple computing devices are connected wirelessly to the same access point (e.g., a workplace environment), the use of wireless docks can result in high consumption of available bandwidth. For example, when a computing device reads a large file from a USB mass storage device that is connected to a wireless dock, the file will be transferred over the wireless network along with the network traffic of any other computing device that is connected to the same access point. This is in contrast to being transferred over the dedicated USB cable as would be the case with a traditional wired dock.

Although the latest Wi-Fi and USB standards provide significant increases in data speed, the performance of a USB device may suffer when it is connected to a computing device via a wireless dock. USB mass storage devices employ the Bulk Only Transport (BoT) protocol. The BoT protocol is a trimmed version of the SCSI protocol and is used on top of the USB transport. When the storage class driver (e.g., disk.sys in Windows) sends a BoT command to read data from or write data to a USB mass storage device, the USB storage port driver (e.g., usbstor.sys or uaspstor.sys) will convert the command into a Command Block Wrapper (CBW), packetize it as a bulk USB request block (URB) and send it to the USB device. The data transfer will then be performed using bulk URBs. Once the data transfer is complete, the USB device will relay the completion status in a Command Status Wrapper (CSW) via a bulk URB. Accordingly, this process includes three steps: (1) the sending of the command; (2) the sending of the data (e.g., read or write); and (3) the sending of the completion status. Each of these steps also requires an acknowledgement. Therefore, the process can be viewed as requiring six transactions between the computing device and the USB device—transactions that would be performed over the wireless network when a wireless dock is used.

In addition to these transactions that are performed to carry out a data transfer, the USB disk stack on the computing device also sends commands as part of maintaining the connection with the USB device. For example, the USB disk stack may periodically send Test Unit Ready commands to probe whether a logical unit is ready to handle commands. Such commands are typically sent both during idle states and during data transfers. Therefore, even when a computing device is not reading from or writing to a USB mass storage device that is connected to a wireless dock, the USB disk stack's Test Unit Ready commands may be consuming a substantial amount of bandwidth.

Furthermore, many USB implementations utilize polling techniques to optimize the reading of data from a USB device. Yet, these polling techniques cause similar increases in bandwidth consumption as Test Unit Ready commands. Although the latest USB standards may address shortcomings in polling using the asynchronous NRDY and ERDY notifications, such notifications are not available in all data transfer modes and directions (e.g., bulk reads) and are not supported by USB 2.0 devices.

In short, when using wireless docks, USB mass storage devices may consume excessive amounts of bandwidth. The consumption of bandwidth may degrade the performance of other peripherals that are connected to the wireless dock and particularly peripherals that require real-time communication such as webcams, microphones and speakers.

BRIEF SUMMARY

The present invention extends to methods, systems, and computer program products for enhancing the performance of a wireless dock when a USB mass storage device is connected. Filter drivers can be loaded on the USB stacks of a computing device and a wireless dock to perform functionality for reducing the number of communications that are sent over a wireless network when a USB mass storage device is connected to the computing device via the wireless dock. This reduction in the number of communications can be accomplished without jeopardizing data integrity or compliance with governing protocols.

In some embodiments, the present invention may be implemented by a computing device filter driver that is loaded on a USB device stack of a computing device as a method for enhancing the performance of a wireless dock to which the computing device is connected when a USB mass storage device is connected to the wireless dock. The computing device filter driver can receive an URB that is being passed down the USB device stack of the computing device. The computing device filter driver can determine that the URB defines a disk probe command that targets the USB mass storage device. The computing device filter driver can determine whether an error notification has not been received from a wireless dock filter driver loaded on a USB device stack of the wireless dock. When the computing device filter driver determines that an error notification has not been received from the wireless dock filter driver, the computing device filter driver completes the URB with a first status. In contrast, when the computing device filter driver determines that an error notification has been received from the wireless dock filter driver, the computing device filter driver completes the URB with a second status.

In some embodiments, the present invention may be implemented as computer storage media storing computer executable instructions which when executed on a computing device implement a computing device filter driver that is configured to perform a method for enhancing the performance of a wireless dock to which the computing device is connected when a USB mass storage device is connected to the wireless dock. The computing device filter driver can receive a first URB that pertains to a bulk in transfer to the USB mass storage device. The computing device filter driver can cause the first URB to be transferred over a wireless network to the wireless dock for delivery to the USB mass storage device. The computing device filter driver can receive a NAK from the USB mass storage device in response to the first URB. The computing device filter driver can receive a second URB that pertains to a bulk in transfer to the USB mass storage device. Based on receiving the NAK from the USB mass storage device in response to the first URB, the computing device filter driver can send a NAK in response to the second URB.

In some embodiments, the present invention may be implemented as computer storage media storing computer executable instructions which implement a computing device filter driver. The computing device filter driver may be configured to selectively complete URBs that define a disk probe command based on whether the computing device filter driver has received an error notification from a wireless dock filter driver. The computing device filter driver may also be configured to complete URBs that pertain to a bulk in transfer with a NAK after a USB mass storage device connected to the wireless dock responds to an URB with a NAK and until the computing device filter driver receives a ready notification from the wireless dock filter driver.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In the specification and the claims, the term "computing device" should be construed as any computing device that can be connected to a wireless dock and that is capable of communicating with a USB mass storage device that is connected to the wireless dock.

Figure 1:
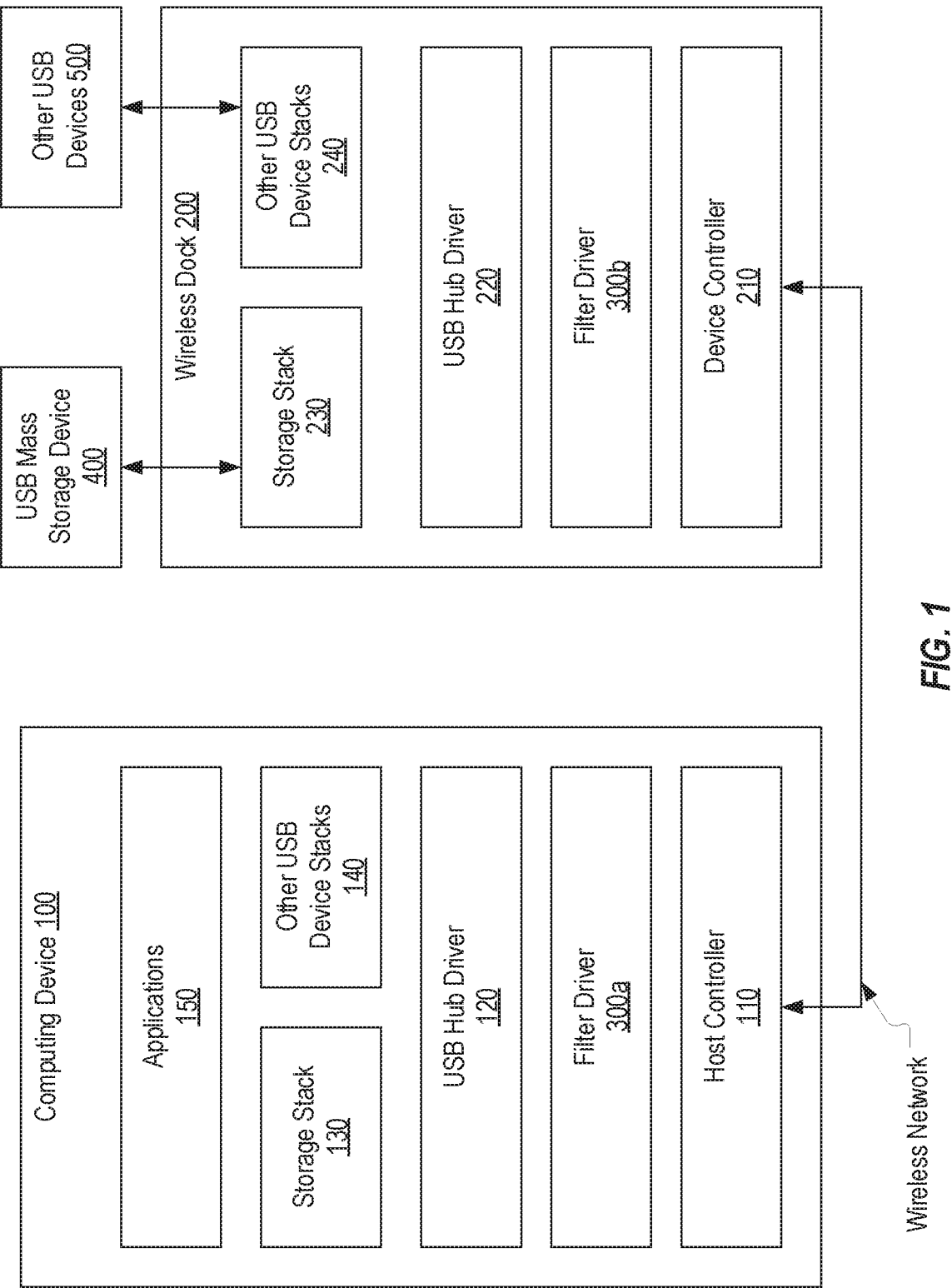
FIG. 1 provides an example of how a computing device and a wireless dock may be configured to enhance the performance of the wireless dock when a USB mass storage device is connected.

FIG. 1 provides an example of various components that may exist on a computing device 100 and a wireless dock 200 that are configured in accordance with embodiments of the present invention. Computing device 100 can include a host controller 110 that is configured to implement any suitable protocol for sending and receiving USB packets over a wireless network such as a Wi-Fi network. For example, host controller 110 may implement the MA-USB protocol or any other USB over IP protocol. Computing device 100 also includes a USB hub driver 120 which may represent any standard USB hub driver, a storage stack 130 which represents the device stack that would be created when a USB mass storage device 400 is connected to computing device 100 via wireless dock 200 and other USB device stacks 140 which represent the device stacks that would be created when other USB devices 500 (e.g., a webcam, microphone, keyboard, mouse, etc.) are connected to computing device 100 via wireless dock 200.

Wireless dock 200 similarly includes a device controller 210 that can implement any suitable protocol for sending and receiving USB packets over a wireless network such as a Wi-Fi network. Wireless dock 200 also includes a USB hub driver 220 which may represent any standard USB hub driver, a storage stack 230 which represents the device stack that would be created on wireless dock 200 when USB mass storage device 400 is connected and other USB device stacks 240 which represent the device stacks that would be created when other USB devices 500 are connected. These components on computing device 100 and wireless dock 200 allow applications 150 executing on computing device 100 to access USB mass storage device 400 and other USB devices 500 that are physically connected to wireless dock 200. However, with these components alone, the performance of wireless dock 200 may suffer when mass storage device 400 is connected as described in the background.

In accordance with embodiments of the present invention, a filter driver 300a and a filter driver 300b may be employed on computing device 100 and wireless dock 200 respectively to enhance the performance of wireless dock 200 when USB mass storage device 400 is connected. As shown, filter driver 300a can be loaded below USB hub driver 120 and filter driver 300b can be loaded below USB hub driver 220. Filter drivers 300a and 300b can perform various functionality to optimize traffic pertaining to USB mass storage device 400 to address the performance degradation that may otherwise occur when the USB traffic travels over a wireless network.

Figure 2:
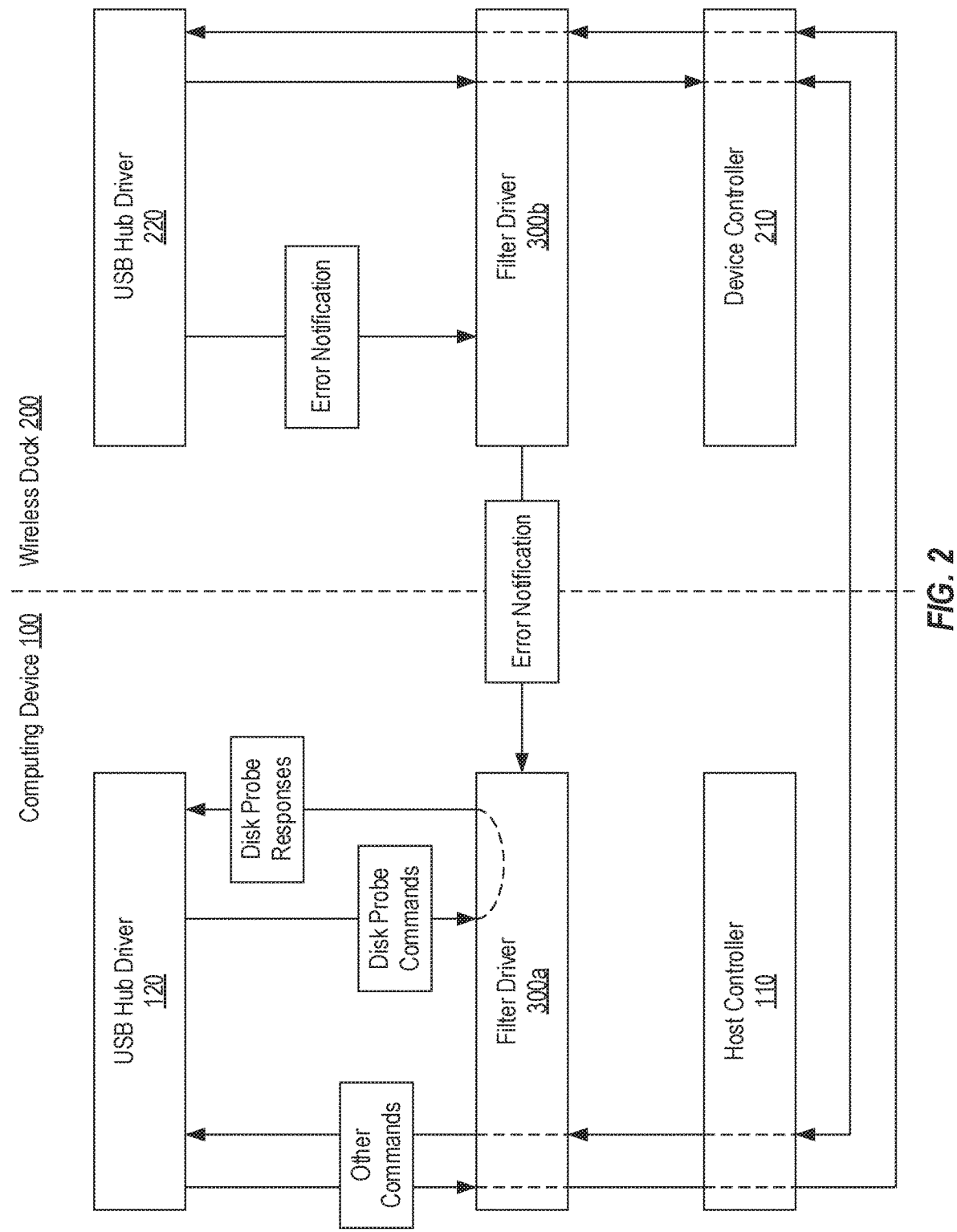
FIG. 2 generally represents how a filter driver on the USB stack of the computing device and a filter driver on the USB stack of the wireless dock can handle disk probe commands to reduce the number of communications that are sent over a wireless network.

FIGS. 2, 3 and 4A-4F illustrate functionality that filter driver 300a and filter driver 300b may perform in some embodiments of the present invention to enhance the performance of a wireless dock when a USB mass storage device is connected. FIG. 2 generally represents how filter driver 300a can handle disk probe commands that target USB mass storage device 400. As shown, unlike with other commands that filter driver 300a may allow to be handled in a typical fashion, filter driver 300a can directly handle disk probe commands to prevent them from being sent over the wireless network to wireless hub 200. More specifically, when it receives a disk probe command that targets USB mass storage device 400, filter driver 300a can generate and return to USB hub driver 120 a disk probe response. Filter driver 300a can structure the content of the disk probe responses based on error notifications that it receives from filter driver 300b.

Figure 3:
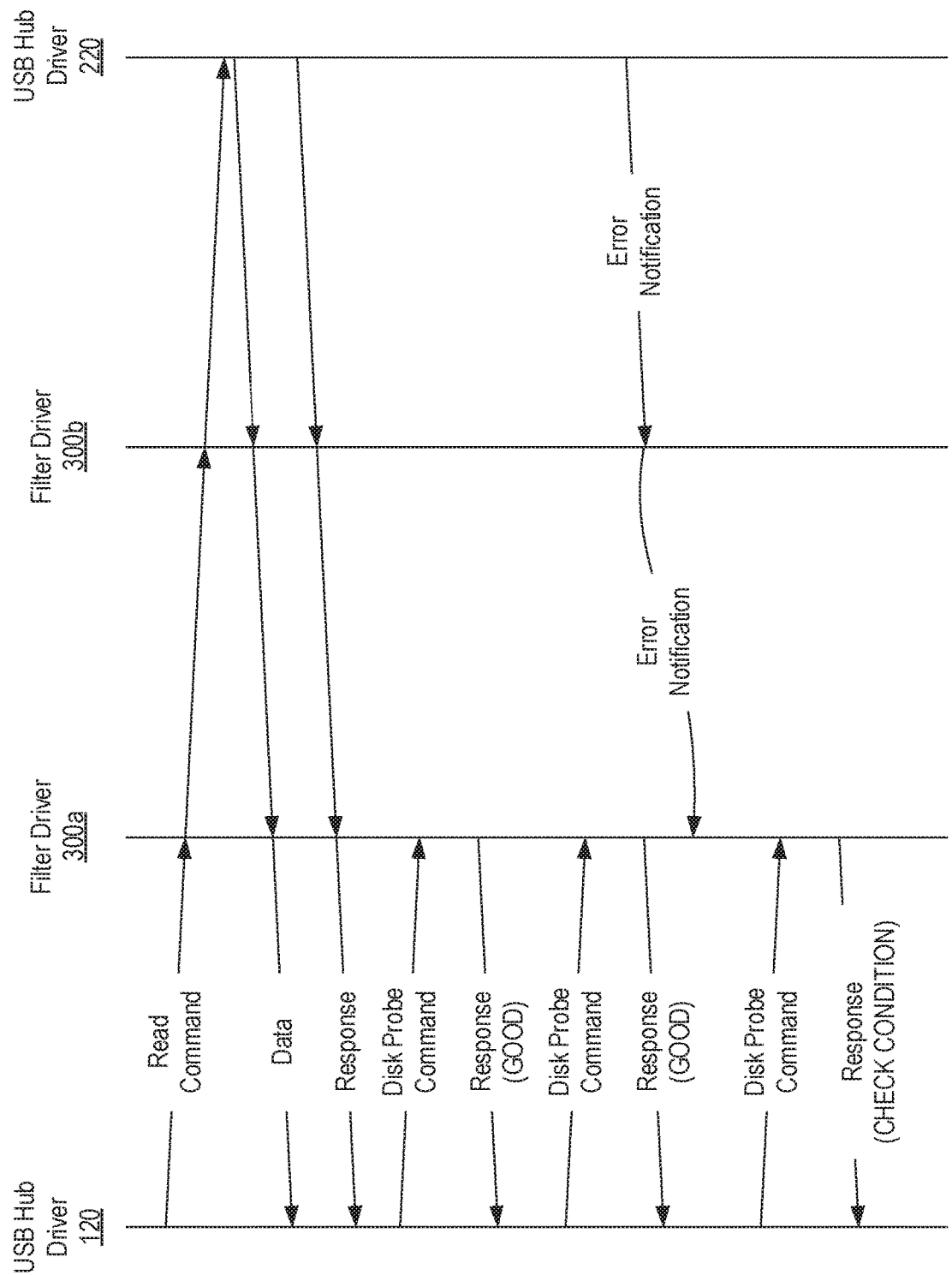
FIG. 3 provides a flow diagram representing how the filter drivers may handle disk probe commands in accordance with some embodiments of the present invention.

FIG. 3 provides a flow diagram representing how filter driver 300a may handle disk probe commands based on error notifications it may have received from filter driver 300b. For simplicity, this flow diagram includes only USB hub driver 120, filter driver 300a, filter driver 300b and USB hub driver 220. The flow diagram initially shows how a read command may be handled, and particularly, that the read command may result in data flowing from USB hub driver 220 to USB hub driver 120 followed by a corresponding response. The flow of the read command is provided as an example context only.

At any time while USB mass storage device 400 is connected to wireless dock 200, USB hub driver 120 may send disk probe commands that target USB mass storage device 400. In this context, the term "disk probe command" may represent any command that the host may employ to determine whether a device is ready. For example, a disk probe command could be in the form of the SCSI TEST UNIT READY command or any equivalent SCSI command (e.g., the GET EVENT STATUS NOTIFICATION command). Filter driver 300a can be configured to detect disk probe commands and directly complete them with a status that is based on whether filter driver 300a has received an error notification from filter driver 300b. For example, FIG. 3 shows that, when filter driver 300a intercepts a disk probe command and has not received an error notification from filter driver 300b, it may complete the disk probe command by sending a response to USB hub driver 120 where the response defines a status of GOOD. In contrast, when filter driver 300 intercepts a disk probe command and has received an error notification from filter driver 300b, it may complete the disk probe command by sending a response to USB hub driver 120 where the response defines a status of CHECK CONDITION.

Figure 4A:
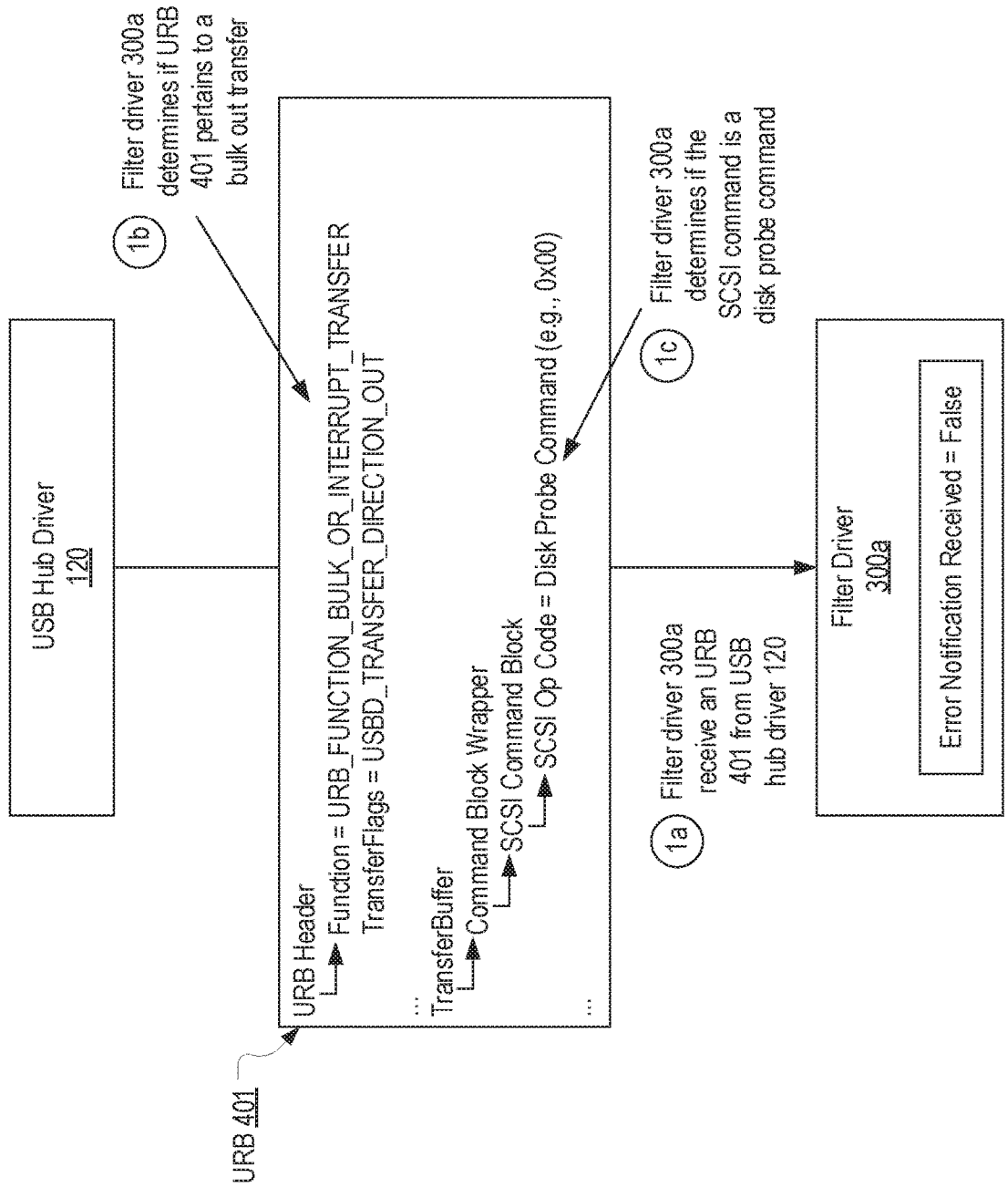
FIGS. 4A-4F provide an example of how the filter drivers may handle disk probe commands in accordance with some embodiments of the present invention.

FIGS. 4A-4F provide an example of the functionality that filter driver 300a and filter driver 300b can implement to handle disk probe commands. In FIG. 4A, USB hub driver 120 is shown as passing a USB request block (URB) 401 down the USB device stack. Because filter driver 300a is loaded below USB hub driver 120, in step 1a, filter driver 300a will receive URB 401 before it is passed to host controller 110. In step 1b, filter driver 300a can access the content of URB 401 to determine if it pertains to a bulk out transfer. For example, filter driver 300a can examine the Function and TransferFlags fields in the URB header to determine if they are set to URB_FUNCTION_BULK_OR_INTERRUPT_TRANSFER and USBD_TRANSFER_DIRECTION_OUT respectively. Although not shown, in some embodiments, prior to performing step 1b, filter driver 300a may first determine that URB 401 targets USB mass storage device 400 (or another mass storage device that is connected to wireless dock 200) as opposed to another type of USB device that is connected to wireless dock 200 or even a USB mass storage device that is connected directly to computing device 100. In other words, filter driver 300a may receive URBs that target any USB device that is connected to computing device 100 but may perform the depicted functionality only on URBs that target a USB mass storage device that is connected to wireless dock 200.

In the depicted example, URB 401 pertains to a bulk out transfer. Therefore, in step 1c, filter driver 300a can determine if URB 401 defines a disk probe command. For example, filter driver 300a can access URB 401's transfer buffer to determine if it includes a command block wrapper containing a SCSI command block that defines a SCSI opcode of 0x00 (TEST UNIT READY) or a SCSI opcode of some other disk probe command. In the depicted example, URB 401 defines a SCSI opcode of 0x00. Filter driver 300a can therefore conclude that URB 401 defines a disk probe command that targets USB mass storage device 400.

In response to determining that URB 401 defines a disk probe command, filter driver 300a can complete the disk probe command directly rather than passing URB 401 down to host controller 401. Notably, if filter driver 300a were to pass URB 401 down to host controller 401, host controller 401 would cause URB 401 to be transferred over the wireless network to device controller 210 on wireless dock 200.

As stated above, the manner in which filter driver 300a completes a disk probe command depends on whether filter driver 300a has received an error notification from filter driver 300b. In the depicted example, it is assumed that filter driver 300a has not received an error notification and therefore maintains an "error notification received" variable that is set to false. In other words, filter driver 300a can maintain some type of indication of whether it has received an error notification.

Figure 4B:
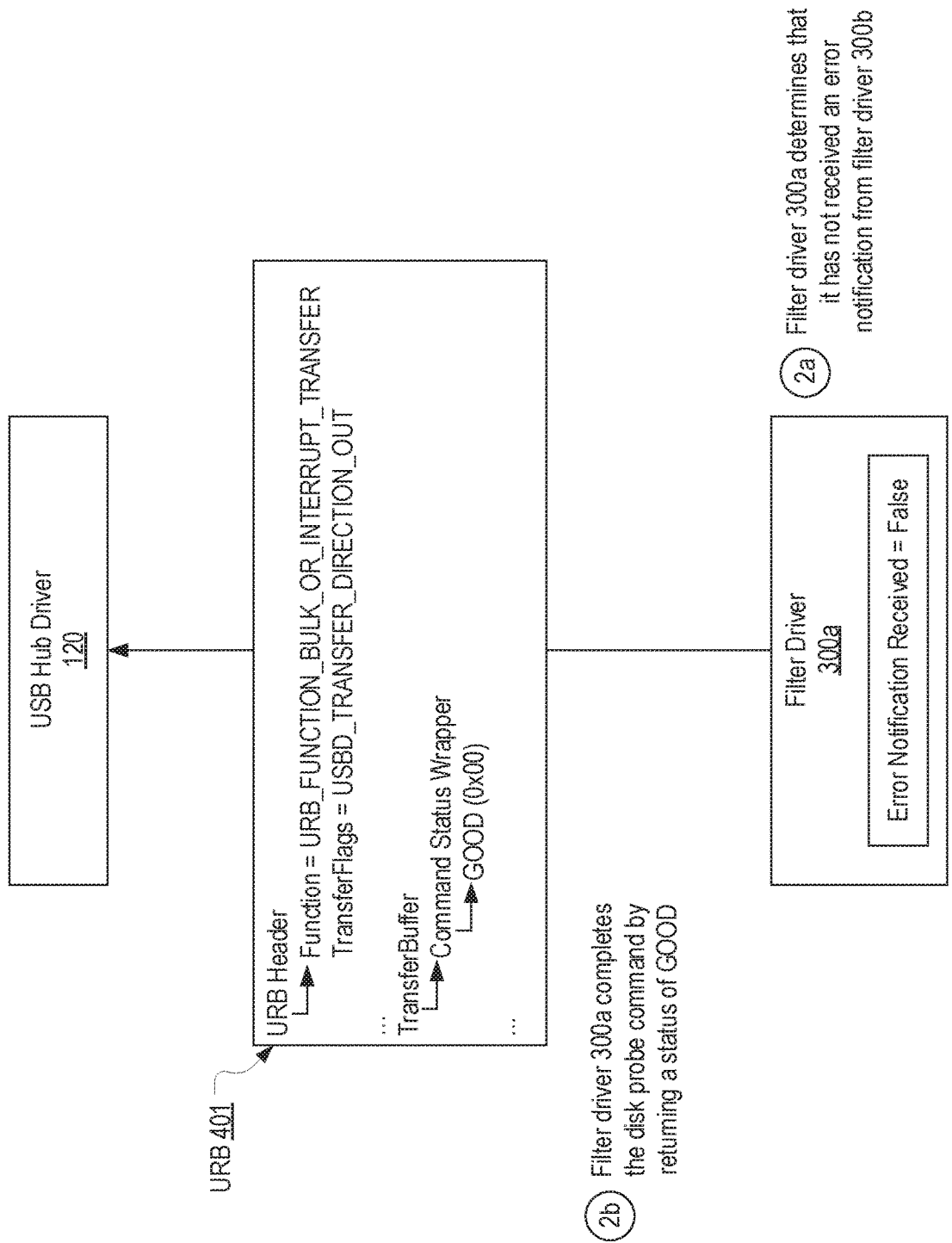

Turning to FIG. 4B, in step 2a and as part of completing the disk probe command defined in URB 401, filter driver 300a can determine that it has not received an error notification from filter driver 300b (e.g., by determining that the error notification received variable is set to false. Therefore, in step 2b, filter driver 300a can complete the disk probe command by including a status of GOOD (0x00) in a command status wrapper contained in URB 401's transfer buffer and sending URB 401 to USB hub driver 120. By doing so, USB hub driver 120 and any other component that may rely on URB 401, will assume that USB mass storage device 400 has responded to the disk probe command with a status of GOOD which may indicate, for example, that USB mass storage device 400 is ready to accept requests.

Figure 4C:
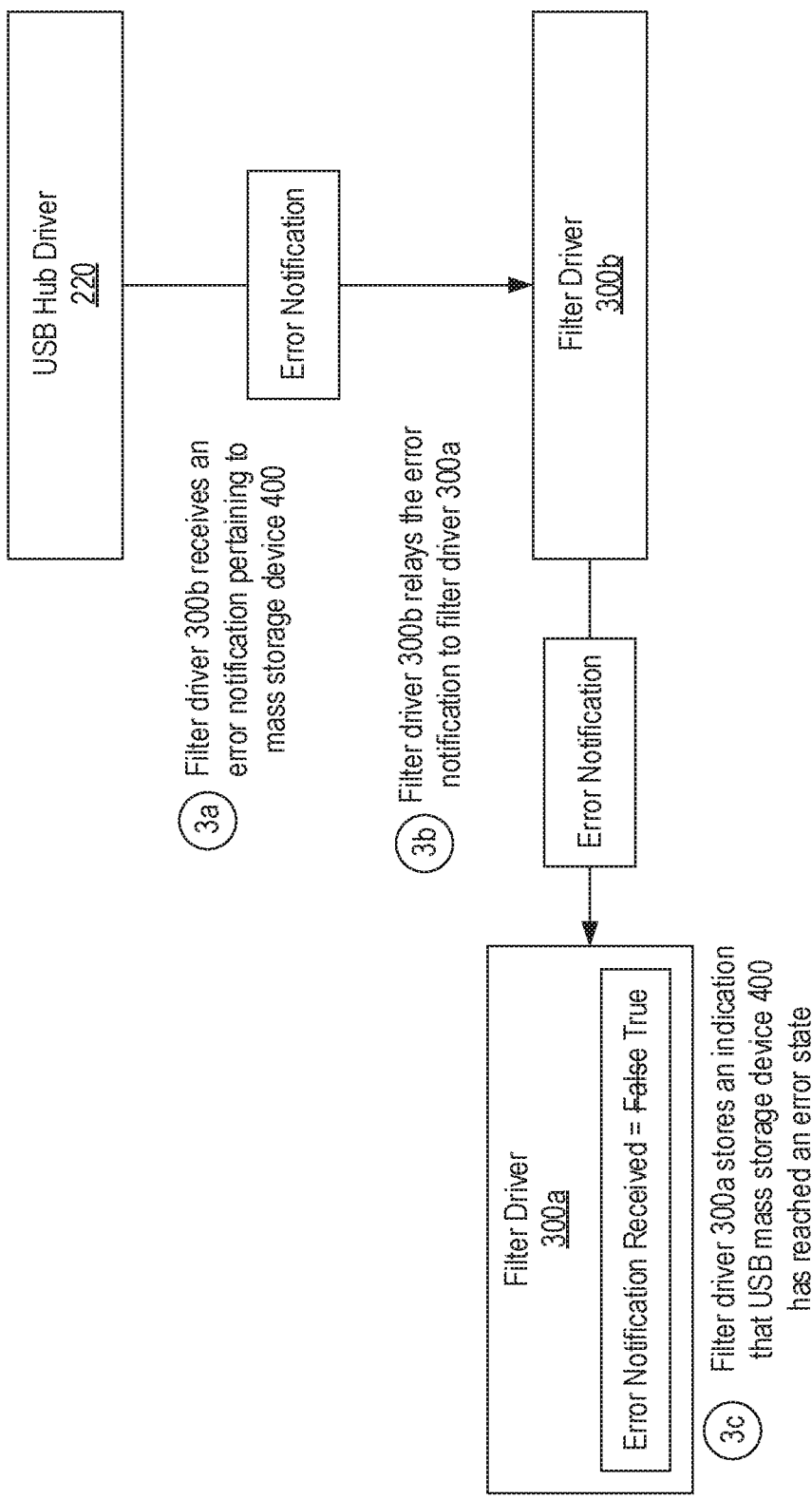

Turning to FIG. 4C, it is assumed that at some point USB hub driver 220 sends an error notification pertaining to USB mass storage device 400. This error notification could represent a variety of errors or conditions that may occur which may prevent USB mass storage device 400 from handling requests or that may require attention. For example, the error notification could indicate that USB mass storage device 400 is not ready, has a full queue, is busy, has experienced a software or hardware error, etc. In step 3a, filter driver 300b receives the error notification that USB hub driver 220 passed down the USB device stack on wireless dock 200. Although not shown, the error notification, like other communications USB hub driver 220 may send, can be in the form of an URB, and therefore, filter driver 300b may examine URBs it receives to identify error notifications pertaining to USB mass storage device 400.

In step 3b, filter driver 300b relays the error notification to filter driver 300a. In some embodiments, filter driver 300b can relay such error notifications to filter driver 300a using an out-of-band communication (i.e., not by passing the notification down the USB device stack). For example, filter driver 300b can send the error notification to filter driver 300a using a reliable transport (e.g., a TCP connection). Regardless of how filter driver 300b may relay the error notification to filter driver 300a, in step 3c, filter driver 300a responds to receiving the error notification by storing an indication that USB mass storage device 400 has reached an error state. In the context of this example, filter driver 300a may do so by changing the error notification received variable to true.

Figure 4D:
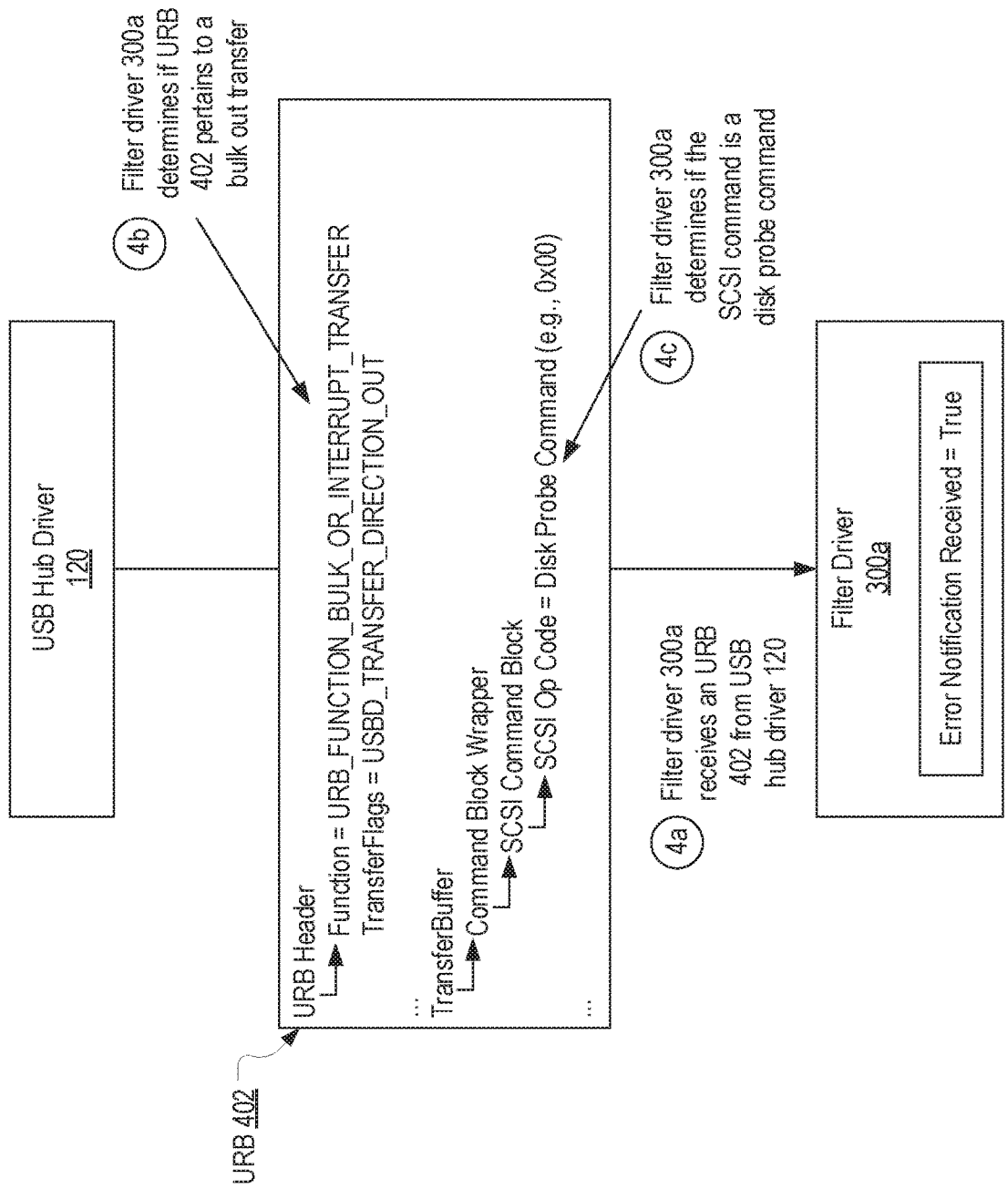
Figure 4E:
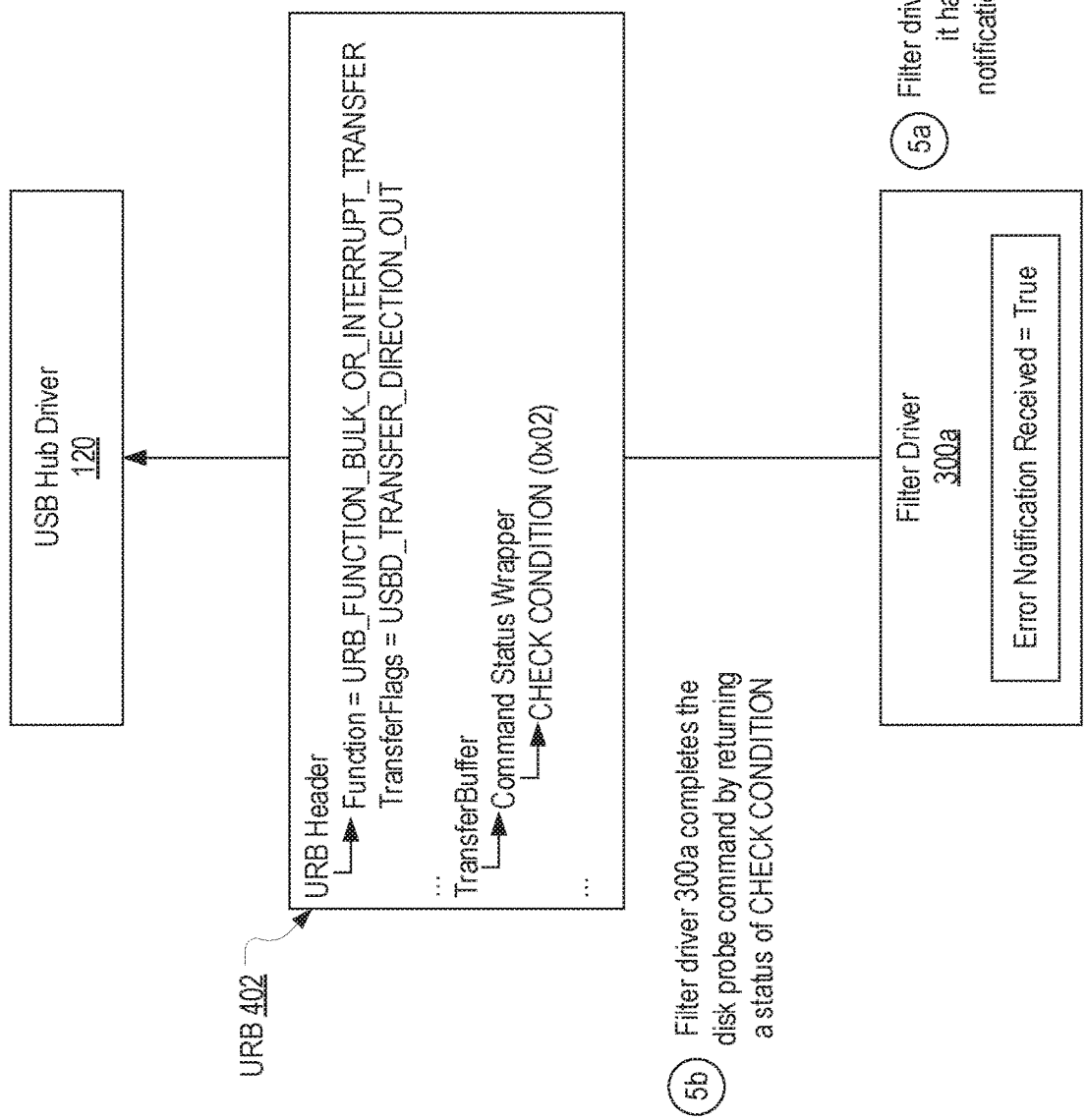

Turning to FIG. 4D, it is assumed that USB hub driver 120 sends an URB 402 at some point after step 3c. In steps 4a-4c, which can be the same as steps 1a-1c, filter driver 300a receives URB 402, determines that URB 402 pertains to a bulk out transfer and determines that URB 402 defines a disk probe command. Turning to FIG. 4E, in step 5*a* and as part as completing the disk probe command defined in URB 402, filter driver 300*a* determines that it has received an error notification from filter driver 300*b*. For example, unlike in step 2*a*, in step 5*a*, filter driver 300*a* can determine that the error notification received variable is set to true. In step 5*b*, filter driver 300*a* can complete the disk probe command by including a status of CHECK CONDITION (0x02) in a command status wrapper contained in URB 402's transfer buffer and sending URB 402 to USB hub driver 120. By doing so, USB hub driver 120 and any other component that may rely on URB 402, will assume that USB mass storage device 400 has responded to the disk probe command with a status of CHECK CONDITION.

Figure 4F:
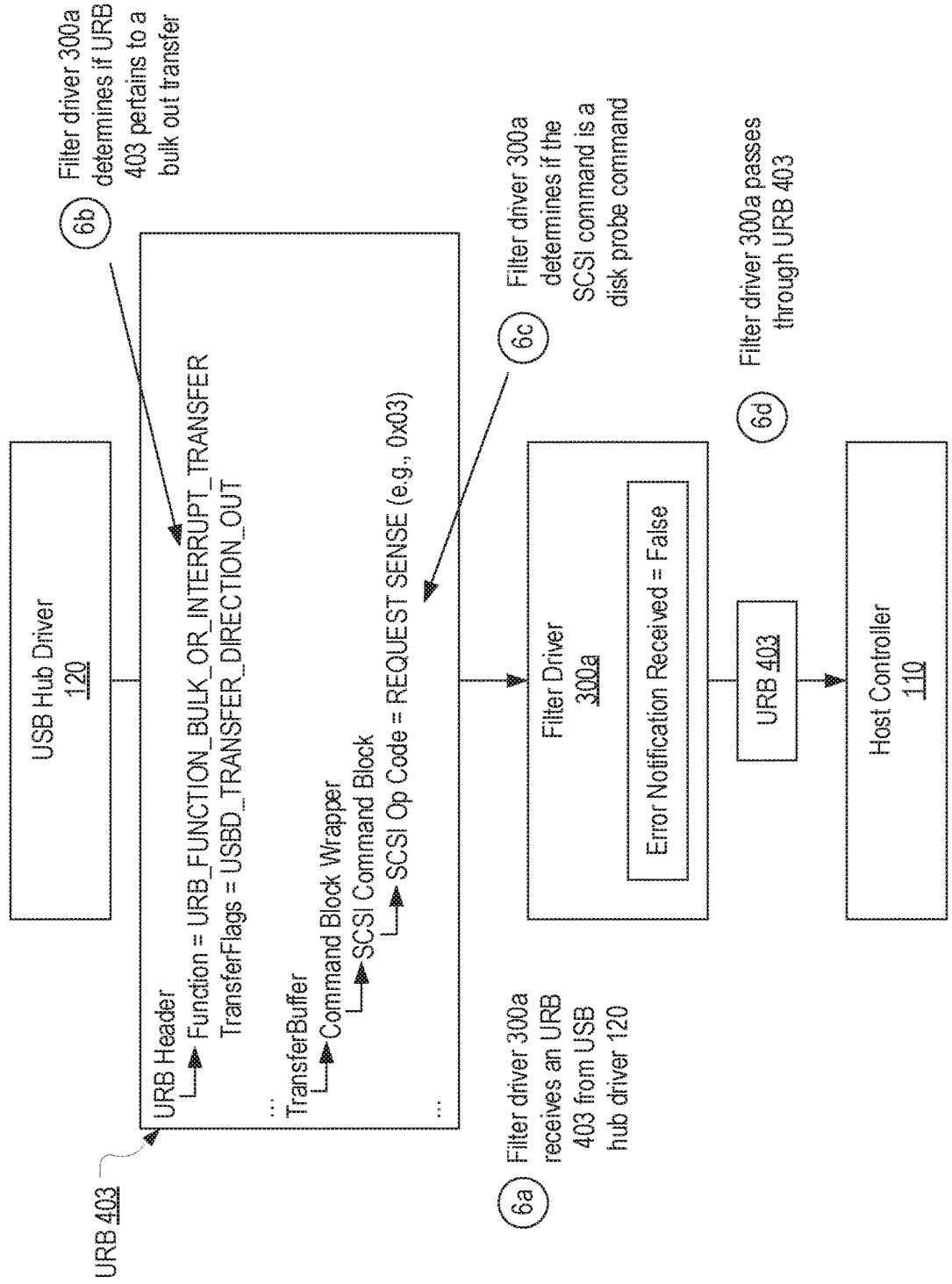

Turning to FIG. 4F, it is assumed that filter driver 300*a*'s completion of the disk probe command with the CHECK CONDITION status has caused USB hub driver 120 to send URB 403 which defines a REQUEST SENSE command. As is known, this command is used to obtain more detail about the CHECK CONDITION status. In steps 6*a*-6*c*, which can be similar to steps 1*a*-1*c* and steps 4*a*-4*c*, filter driver 300*a* can receive URB 403, determine that URB 403 pertains to a bulk out transfer and determine that the SCSI command is not a disk probe command. Because URB 403 does not define a disk probe command, in step 6*d*, filter driver 300*a* can pass URB 403 down the USB device stack to host controller 110. Host controller 110 will then send URB 403 over the wireless network for delivery to USB mass storage device 400. FIG. 4F also represents that the error notification received variable has been changed back to false. Filter driver 300*a* may reset the error notification received variable after it completes a disk probe command with the CHECK CONDITION status (or other error status).

In typical implementations, filter driver 300*a* may receive many URBs that define disk probe requests when filter driver 300*b* has not reported an error notification. Accordingly, filter driver 300*a* may complete many disk probe requests with a GOOD status without sending the URBs containing the disk probe requests over the wireless network. In this way, filter driver 300*a* can reduce the amount of bandwidth that is consumed when a USB mass storage device is connected to a wireless dock. Notably, this reduction in bandwidth consumption is accomplished without jeopardizing data integrity and while complying with the governing protocols.

Figure 5:
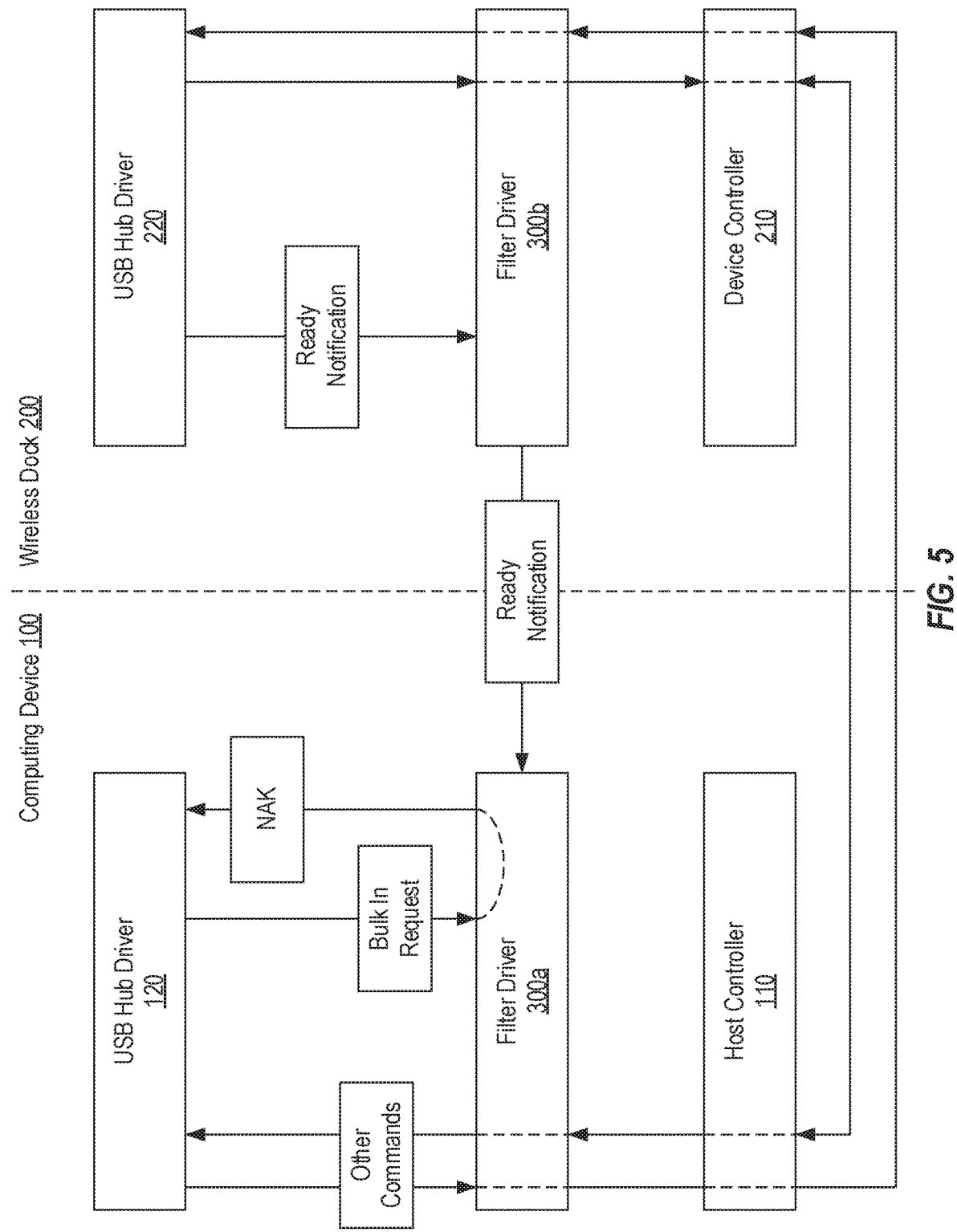
FIG. 5 generally represents how a filter driver on the USB stack of the computing device and a filter driver on the USB stack of the wireless dock can handle bulk in requests to reduce the number of communications that are sent over a wireless network.

FIGS. 5, 6 and 7A-7E also illustrate functionality that filter driver 300*a* and filter driver 300*b* may perform in some embodiments of the present invention to enhance the performance of a wireless dock when a USB mass storage device is connected. FIG. 5 generally represents how filter driver 300*a* can handle bulk in requests that target USB mass storage device 400. As shown, unlike with other commands that filter driver 300*a* may allow to be handled in a typical fashion, filter driver 300*a* can directly handle bulk in requests in some scenarios to prevent them from being sent over the wireless network to wireless hub 200. More specifically, when it receives a bulk in request that targets USB mass storage device 400 when USB mass storage device 400 does not have data to be read, filter driver 300*a* can generate and return to USB hub driver 120 a NAK (or "negative acknowledgement"). Filter driver 300*a* can determine whether USB mass storage device 400 has data to be read based on ready notifications that it receives from filter driver 300*b*.

Figure 6:
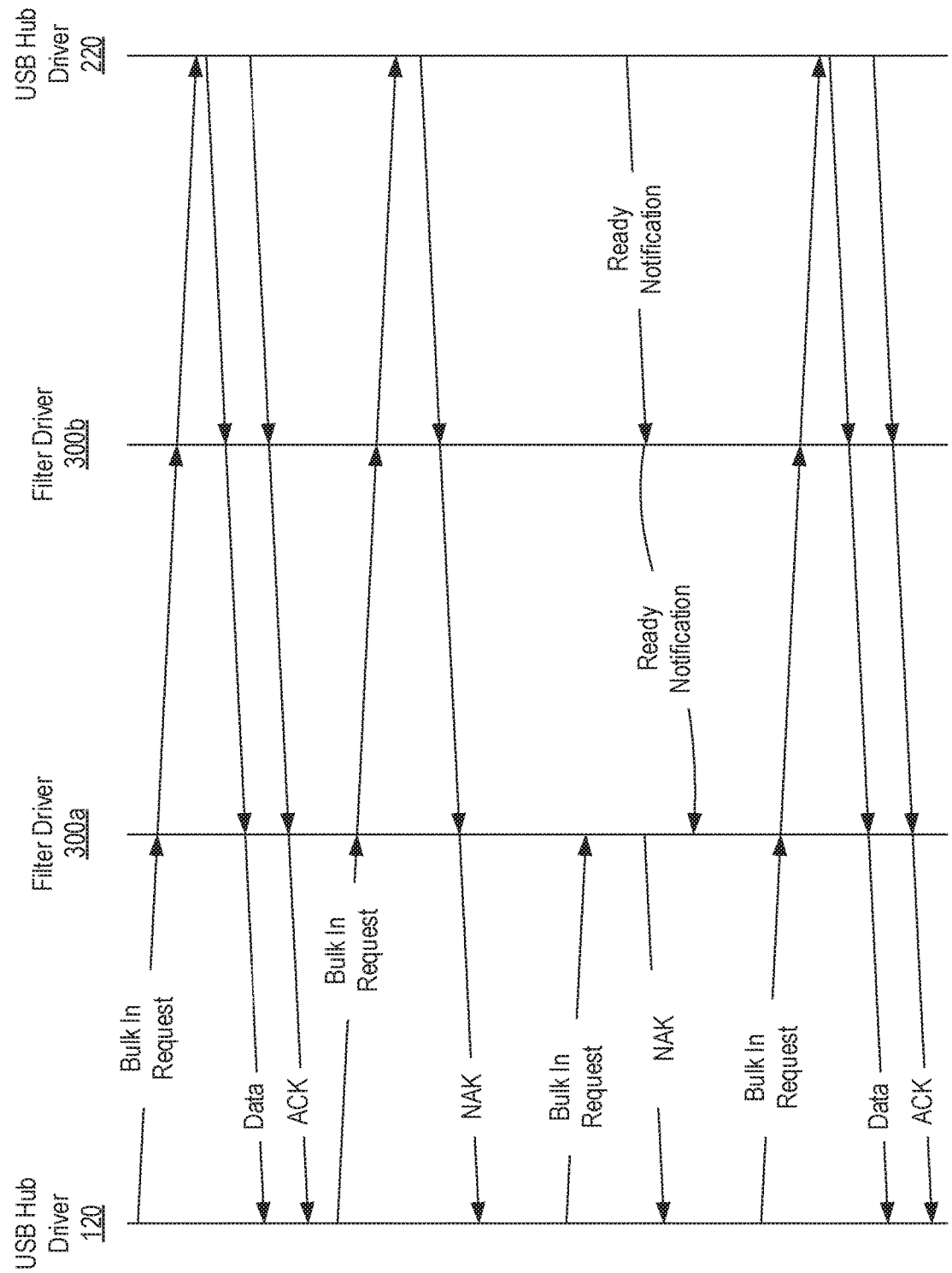
FIG. 6 provides a flow diagram representing how the filter drivers may handle bulk in requests in accordance with some embodiments of the present invention.

FIG. 6 provides a flow diagram representing how filter driver 300*a* may handle bulk in requests based on ready notifications it may have received from filter driver 300*b*. As with the flow diagram in FIG. 3, this flow diagram includes only USB hub driver 120, filter driver 300*a*, filter driver 300*b* and USB hub driver 220. The flow diagram initially shows how a bulk in request (e.g., a read request) may be handled, and particularly, that the bulk in request may be sent over the wireless network to USB mass storage device 400 resulting in data flowing from USB hub driver 220 to USB hub driver 120 followed by a corresponding response. In the case that the bulk in request is successfully completed, the response may be in the form of an ACK. In contrast, if a bulk in request is not successfully completed, the response may be in the form of a NAK. FIG. 6 shows that, after filter driver 300*a* detects the occurrence of a NAK, filter driver 300*a* may directly complete subsequent bulk in requests with a NAK until filter driver 300*b* sends a ready notification. After receiving a ready notification from filter driver 300*b*, filter driver 300*a* may resume passing bulk in requests down the USB device stack. In this way, filter driver 300*a* can prevent bulk in requests from being sent over the wireless network when the bulk in requests are likely to result in NAKs (e.g., when polling is performed).

Figure 7A:
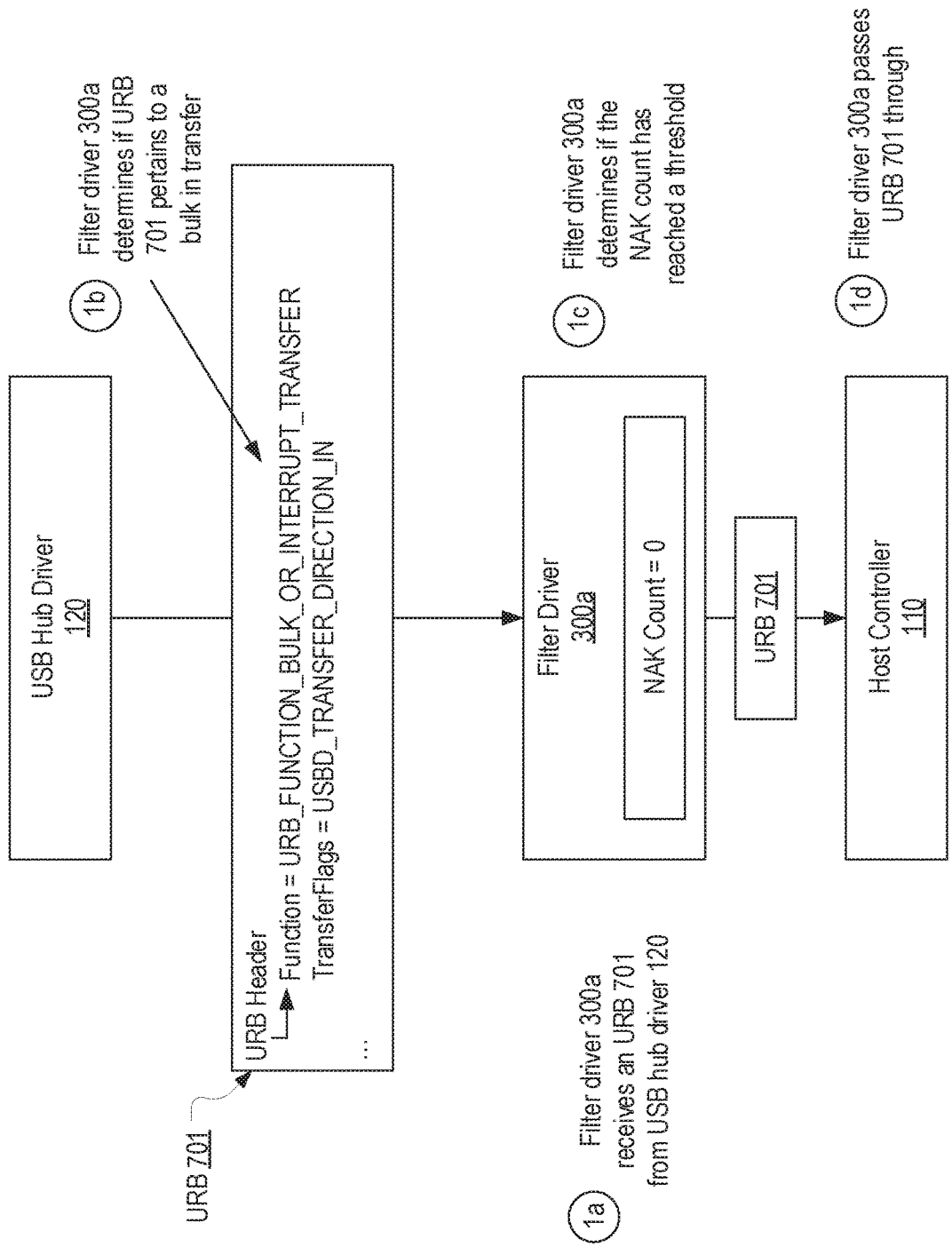
FIGS. 7A-7E provide an example of how the filter drivers may handle bulk in requests in accordance with some embodiments of the present invention.

FIGS. 7A-7E provide an example of the functionality that filter driver 300*a* and filter driver 300*b* can implement to handle bulk in requests. In FIG. 7A, USB hub driver 120 is shown as passing an URB 701 down the USB device stack. For purposes of this example, it will be assumed that filter driver 300*a* maintains a NAK count variable which is set to 0 when filter driver 300*a* receives URB 701 in step 1*a*. As part of processing URB 701 (and other URBs it may receive), in step 1*b*, filter driver 300*a* determines if URB 701 pertains to a bulk in transfer. For example, filter driver 300*a* can examine the Function and TransferFlags fields of the URB header as described above. In this example, URB 701 pertains to a bulk in transfer, and therefore, filter driver 300*a* can determine whether to complete it directly with a NAK or send it down the USB device stack. To perform this determination, in step 1*c*, filter driver 300*a* may access the NAK count variable to determine whether it has reached a threshold. The NAK count variable can represent the number of NAKs that filter driver 300*a* has detected that USB mass storage device 400 has sent in response to bulk in requests. The threshold can be any suitable value including 1. In the depicted example, since the NAK count variable is set to 0, in step 1*d*, filter driver 300*a* can send URB 701 down the USB device stack to cause host controller 110 to send it over the wireless network for delivery to USB mass storage device 400.

Figure 7B:
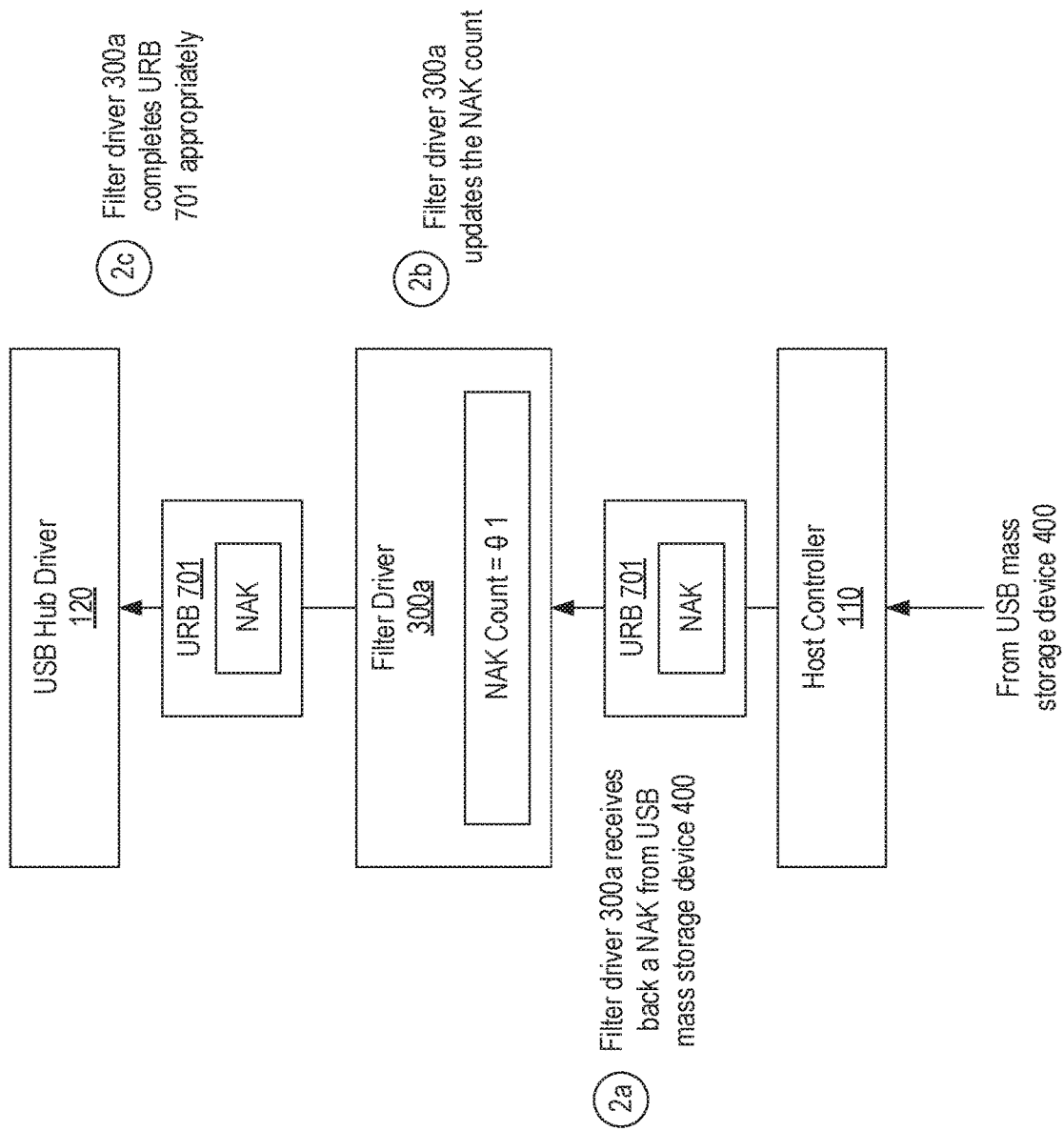

Turning to FIG. 7B, it is assumed that USB mass storage device 400 received the bulk in request defined in URB 701 and has responded with a NAK. Accordingly, in step 2*a*, filter driver 300*a* can receive URB 701 which now includes the NAK. In step 2*b*, and in response to detecting the NAK, filter driver 300*a* can update the NAK count variable. In the depicted example, this is shown as incrementing the NAK count variable from 0 to 1, but filter driver 300*a* may utilize any technique for tracking the occurrence of a NAK. In step 2*c*, filter driver 300*a* can pass the URB 701 with the NAK up to USB hub driver 120.

Figure 7C:
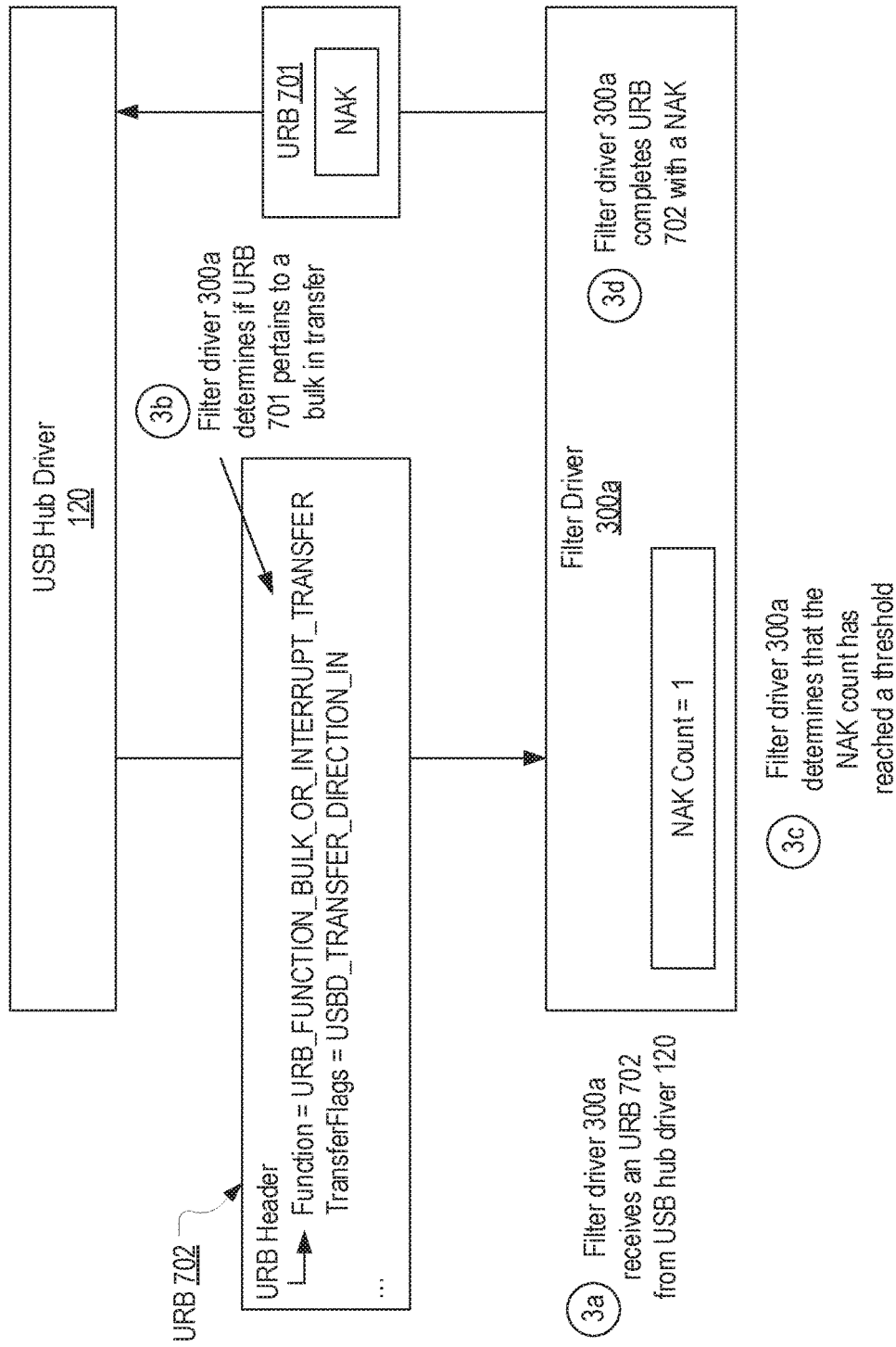

Turning to FIG. 7C, it is now assumed that USB hub driver 120 sends another URB 702, and in response, filter driver 300*a* can perform steps 3*a*-3*c* which can be the same as steps 1*a*-1*c*. However, in step 3*c*, filter driver 300*a* will determine that the NAK count variable has reached the threshold of 1. In response, in step 3*d*, filter driver 300*a* can directly complete URB 702 with a NAK as opposed to passing URB 702 down the USB device stack. In other words, when filter driver 300*a* receives a bulk in request when the NAK count variable has reached the threshold, filter driver 300*a* can immediately return a NAK rather than allowing the bulk in request to be sent over the wireless network. In instances when polling is performed, the steps shown in FIG. 7C may be repeatedly performed.

Figure 7D:
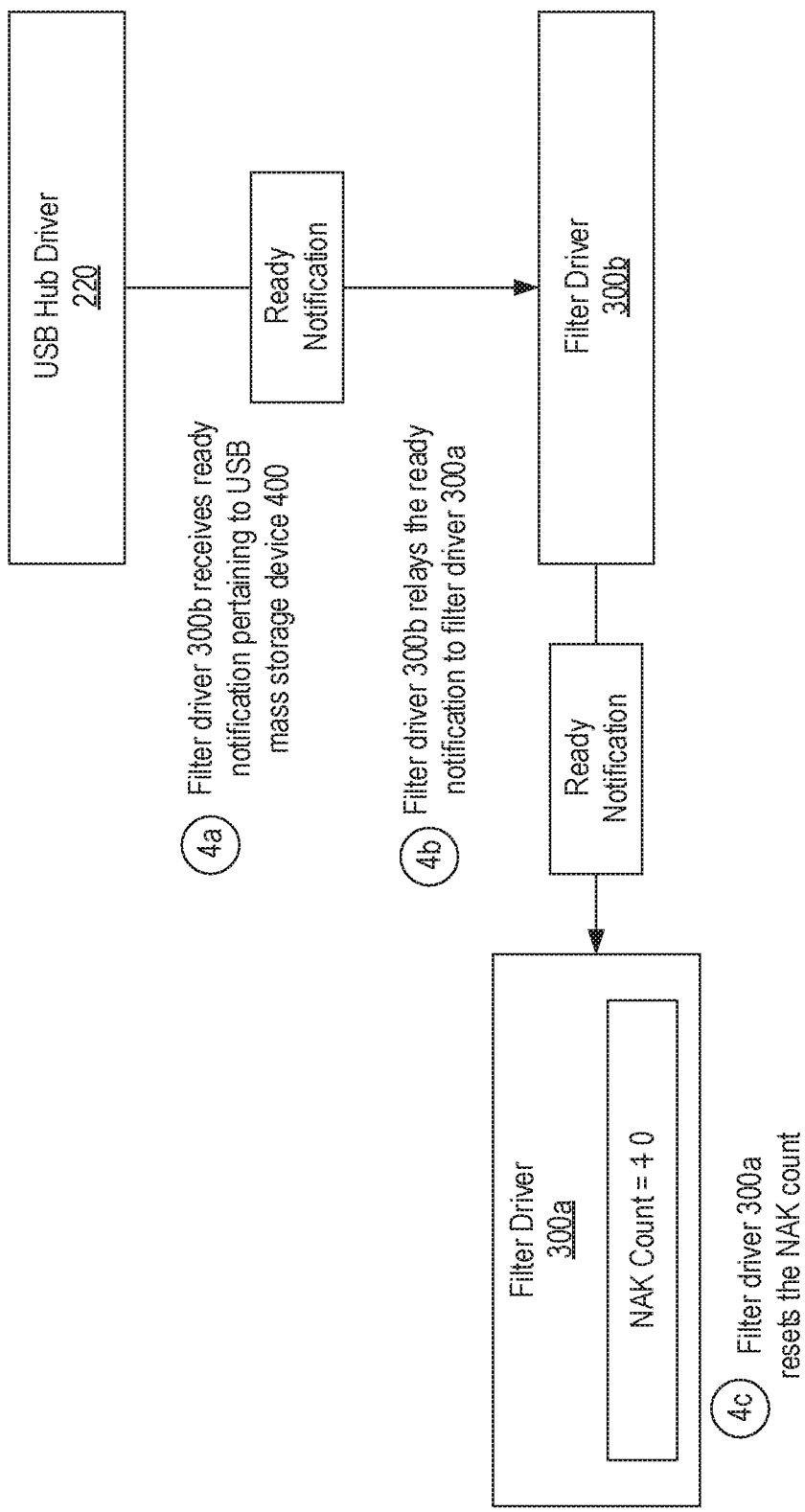

Turning to FIG. 7D, at some point, a ready notification may be sent down the USB device stack on wireless dock 200 to indicate the USB mass storage device 400 is ready to receive bulk in requests. In step 4*a*, filter driver 300*b* receives the ready notification, and in step 4*b*, relays the ready notification to filter driver 300*a*. As described above with regards to the error notifications, filter driver 300*b* may relay ready notifications using out-of-band communications in some embodiments. In step 4*c* and in response to receiving the ready notification from filter driver 300*b*, filter driver 300*a* can reset the NAK count variable (or otherwise store an indication that USB mass storage device 400 is now ready to receive bulk in requests).

Figure 7E:
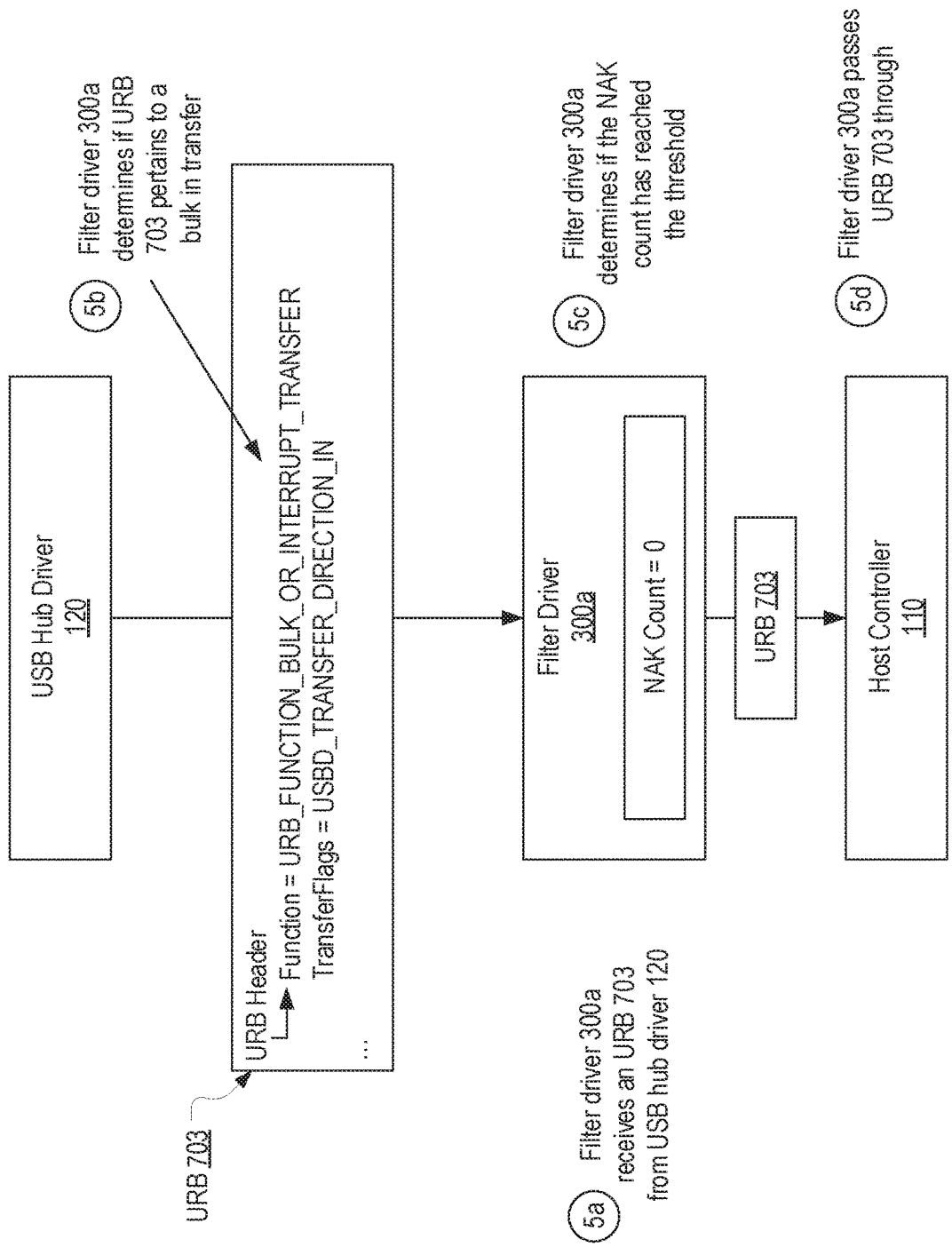

Turning to FIG. 7E, it is assumed that, at some time after step 4*c*, USB hub driver 120 sends an URB 703. Filter driver 300*a* can then perform steps 5*a*-5*d*, which can be the same as steps 1*a*-1*d*, to pass URB 703 down the USB device stack. Of primary importance, because filter driver 300*a* has reset the NAK count variable, in step 5*c*, filter driver 300*a* will determine that the NAK count has not reached the threshold and will therefore forego directly completing URB 703 with a NAK.

To summarize, filter driver 300*a* can allow bulk in requests to be transferred over the wireless network for delivery to USB mass storage device 400 until USB mass storage device 400 returns one or more consecutive NAKs after which filter driver 300*a* can commence directly completing bulk in requests with a NAK. Filter driver 300*a* can continue to directly complete bulk in requests until filter driver 300*b* provides a ready notification. In this way, filter driver 300*a* can prevent bulk in requests from consuming bandwidth unnecessarily.

Filter driver 300*a* and filter driver 300*b* may be configured to perform only the functionality represented in FIGS. 2-4F, only the functionality represented in FIGS. 5-7E or both. In some embodiments, filter driver 300*a* and filter driver 300*b* may be configured to selectively perform the functionality based on available bandwidth. For example, if bandwidth is not being excessively consumed, filter driver 300*a* and filter driver 300*b* may allow disk probe commands and/or bulk in requests to be handled in a typical fashion. In contrast, once bandwidth is being excessively consumed, filter driver 300*a* and filter driver 300*b* may commence handling disk probe commands and/or bulk in requests in the manner described above.

By performing this functionality, filter driver 300*a* and filter driver 300*b* can reduce the consumption of a wireless network's bandwidth when USB mass storage devices are connected to wireless docks. By reducing bandwidth consumption, the performance of the USB mass storage devices as well as the performance of other USB devices that may be connected to the wireless dock can be improved. Embodiments of the present invention may be particularly beneficial in a workplace environment, education environment or similar environment where many computing devices may connect to wireless docks over the same wireless network. However, embodiments of the present invention can be implemented whenever any computing device connects to a wireless dock.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a computing device filter driver that is loaded on a USB device stack of a computing device, for enhancing performance of a wireless dock to which the computing device is connected when a Universal Serial Bus (USB) mass storage device is connected to the wireless dock, the method comprising:

receiving a USB request block (URB) that is being passed down a USB device stack of the computing device;

determining that the URB defines a disk probe command that targets the USB mass storage device;

determining whether an error notification has not been received from a wireless dock filter driver loaded on a USB device stack of the wireless dock such that:

when the computing device filter driver determines that an error notification has not been received from the wireless dock filter driver, the computing device filter driver completes the URB with a first status; whereas when the computing device filter driver determines that an error notification has been received from the wireless dock filter driver, the computing device filter driver completes the URB with a second status.

2. The method of claim 1, wherein the computing device filter driver determines that the URB defines a disk probe command in response to determining that the URB pertains to a bulk out transfer.

3. The method of claim 2, wherein determining that the URB defines a disk probe command comprises determining that the URB includes a Small Computer System Interface (SCSI) TEST UNIT READY command.

4. The method of claim 1, wherein the first status indicates that the USB mass storage device is ready.

5. The method of claim 4, wherein the second status indicates that the USB mass storage device is not ready.

6. The method of claim 5, wherein the second status is CHECK CONDITION.

7. The method of claim 1, wherein the computing device filter driver receives error notifications from the wireless dock filter driver via out-of-band communications.

8. The method of claim 1, further comprising:

receiving a second URB that is being passed down the USB device stack of the computing device;

determining that the second URB pertains to a bulk in transfer;

determining whether the USB mass storage device has provided one or more negative acknowledgements (NAKs) such that:

when the computing device filter driver determines that the USB mass storage device has not provided one or more NAKs, the computing device filter driver passes the second URB down the USB device stack on the computing device; whereas when the computing device filter driver determines that the USB mass storage device has provided one or more NAKs, the computing device filter driver completes the second URB with a NAK.

9. The method of claim 8, wherein determining whether the USB mass storage device has provided one or more NAKs comprises accessing a NAK count variable.

10. The method of claim 9, wherein the computing device filter driver updates the NAK count variable in response to receiving a NAK from the USB mass storage device.

11. The method of claim 10, wherein the computing device filter driver resets the NAK count variable in response to receiving a ready notification from the wireless dock filter driver.

12. One or more computer storage media storing computer executable instructions which when executed on a computing device implement a computing device filter driver that is configured to perform a method for enhancing performance of a wireless dock to which the computing device is connected when a Universal Serial Bus (USB) mass storage device is connected to the wireless dock, the method comprising:

receiving a first USB request block (URB) that pertains to a bulk in transfer to the USB mass storage device;

causing the first URB to be transferred over a wireless network to the wireless dock for delivery to the USB mass storage device;

receiving a negative acknowledgement (NAK) from the USB mass storage device in response to the first URB;

receiving a second URB that pertains to a bulk in transfer to the USB mass storage device; and based on receiving the NAK from the USB mass storage device in response to the first URB, sending a NAK in response to the second URB.

13. The computer storage media of claim 12, wherein the method further comprises:

receiving a ready notification from a wireless dock filter driver;

receiving a third URB that pertains to a bulk in transfer to the USB mass storage device; and based on receiving the ready notification, causing the third URB to be transferred over the wireless network to the wireless dock for delivery to the USB mass storage device.

14. The computer storage media of claim 13, wherein the computing device filter driver updates a NAK count variable in response to receiving the NAK from the USB mass storage device, and wherein the computing device filter driver sends the NAK in response to the second URB upon determining that the NAK count variable has reached a threshold.

15. The computer storage media of claim 14, wherein the computing device filter driver resets the NAK count variable in response to receiving the ready notification, and wherein the computing device filter driver causes the third URB to be transferred over the wireless network in response to determining that the NAK count variable has not reached the threshold.

16. The computer storage media of claim 12, wherein the method further comprises:

selectively completing URBs that define a disk probe command based on whether the computing device filter driver has received an error notification from a wireless dock filter driver.

17. The computer storage media of claim 16, wherein selectively completing URBs that define a disk probe command comprises completing one or more URBs with a first status before an error notification is received from the wireless dock filter driver and completing an URB with a second status after an error notification is received from the wireless dock filter driver.

18. The computer storage media of claim 17, wherein the method further comprises:

after completing the URB with the second status, completing one or more URBs with the first status until another error notification is received from the wireless dock filter driver.

19. One or more computer storage media storing computer executable instructions which implement a computing device filter driver, wherein the computing device filter driver is configured to:

selectively complete Universal Serial Bus (USB) request blocks (URBs) that define a disk probe command based on whether the computing device filter driver has received an error notification from a wireless dock filter driver; and complete URBs that pertain to a bulk in transfer with a negative acknowledgement (NAK) after a USB mass storage device connected to a wireless dock responds to an URB with a NAK and until the computing device filter driver receives a ready notification from the wireless dock filter driver.

20. The computer storage media of claim 19, wherein the computer executable instructions further implement the wireless dock filter driver that is configured to:
   send error notifications to the computing device filter driver; and
   send ready notifications to the computing device filter driver.

* * * * *